(12) United States Patent
Youtz et al.

(10) Patent No.: US 9,247,484 B2
(45) Date of Patent: Jan. 26, 2016

(54) LIMITING OF PACKET DATA NETWORK CONNECTION REQUESTS FOR WIRELESS DEVICES

(71) Applicant: Cellco Partnership, Arlington, VA (US)

(72) Inventors: Andrew E Youtz, Princeton, NJ (US); Christopher M Schmidt, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 716 days.

(21) Appl. No.: 13/672,075

(22) Filed: Nov. 8, 2012

(65) Prior Publication Data
US 2014/0126469 A1 May 8, 2014

(51) Int. Cl.
*H04W 4/00* (2009.01)
*H04W 48/02* (2009.01)
*H04W 76/00* (2009.01)
*H04W 76/02* (2009.01)

(52) U.S. Cl.
CPC ............ *H04W 48/02* (2013.01); *H04W 76/027* (2013.01)

(58) Field of Classification Search
None
See application file for complete search history.

(56) References Cited

U.S. PATENT DOCUMENTS

| | | | |
|---|---|---|---|
| 2010/0046538 A1* | 2/2010 | Cabrera Escandell | H04L 69/16 370/419 |
| 2012/0263076 A1* | 10/2012 | Zhao | H04W 76/025 370/254 |
| 2014/0051437 A1* | 2/2014 | Diachina | H04W 48/06 455/434 |

* cited by examiner

*Primary Examiner* — Ayaz Sheikh
*Assistant Examiner* — Sori Aga (57) ABSTRACT

Packet data network (PDN) connection requests from a mobile device may be limited by the mobile device. In one implementation, the mobile device may track an amount of successful PDN connection requests issued by the mobile device over a cellular network and maintain a timer value relating to an amount of time over which the successful PDN connection requests have been tracked. The mobile device may determine an allowable number of PDN connection requests and compare the amount of successful PDN connection requests to the allowable number of PDN connection requests. The mobile device may determine, based on the comparison, whether to block a PDN connection request from being issued to the cellular network.

24 Claims, 9 Drawing Sheets

LIMITING OF PACKET DATA NETWORK CONNECTION REQUESTS FOR WIRELESS DEVICES

BACKGROUND

A mobile phone (also known as a cellular phone) is a device that can connect to a network, such as a network for making telephone calls or connecting to data networks, over a radio link while moving around a geographic area. The network to which the mobile phone connects may be a cellular network provided by a mobile phone operator. Modern mobile phones frequently include smartphones, which may include a phone that includes a mobile operating system. Smartphones may include applications, such as an Internet browser program, or other smartphone "apps," that interact with, through the cellular network, one or more packet data networks, such as the Internet.

A mobile phone, such as a smartphone, may connect to a packet data network by initiating a connection to the packet data network. The connection may be made via a gateway device that provides an interface between the cellular network and the packet data network. When a mobile phone is finished with a connection, it may initiate termination of the connection. Forming and terminating a connection are both operations that can use a non-trivial amount of resources of the cellular network.

DETAILED DESCRIPTION OF PREFERRED EMBODIMENTS

The following detailed description refers to the accompanying drawings. The same reference numbers in different drawings may identify the same or similar elements.

In some situations, a malicious program, such as a virus or other malicious program, may issue a large number of packet data network (PDN) connection requests and disconnection requests (e.g., requests to terminate a connection). Additionally, due to programming errors or incompatibility errors, even non-malicious applications can potentially enter a state in which the corresponding mobile device issues an excessive number of connection/disconnection requests. Each connection request and/or disconnection request may cause a cellular network to perform a number of signaling operations (e.g., authentication and connection formation-related operations) that may involve network devices in the cellular network. An excessive number of connection requests and disconnection requests, by one or more mobile devices, can potentially overwhelm the cellular network.

Techniques described herein may provide for a mechanism to limit PDN connection requests from a mobile device. The connection limiting mechanism may be performed at an operating system or firmware level of the mobile device. For example, in one implementation, a connection limiting component may monitor the rate at which the mobile device creates connection requests to a particular PDN. A time window may be defined (e.g., a one hour period) and a maximum number of PDN connections may be allowed within the time window. Additionally, within the time window, the connection limiting component may place additional limits on the distribution of the connection requests. For instance, the time window may be divided into a number of time slots (e.g., 12 slots, each five minutes in length), and each slot may be associated with a second limit on the number of PDN connections. A counter that tracks the number of successful PDN connection requests, by the mobile device, may be reset at the end of each time window.

Figure 1:
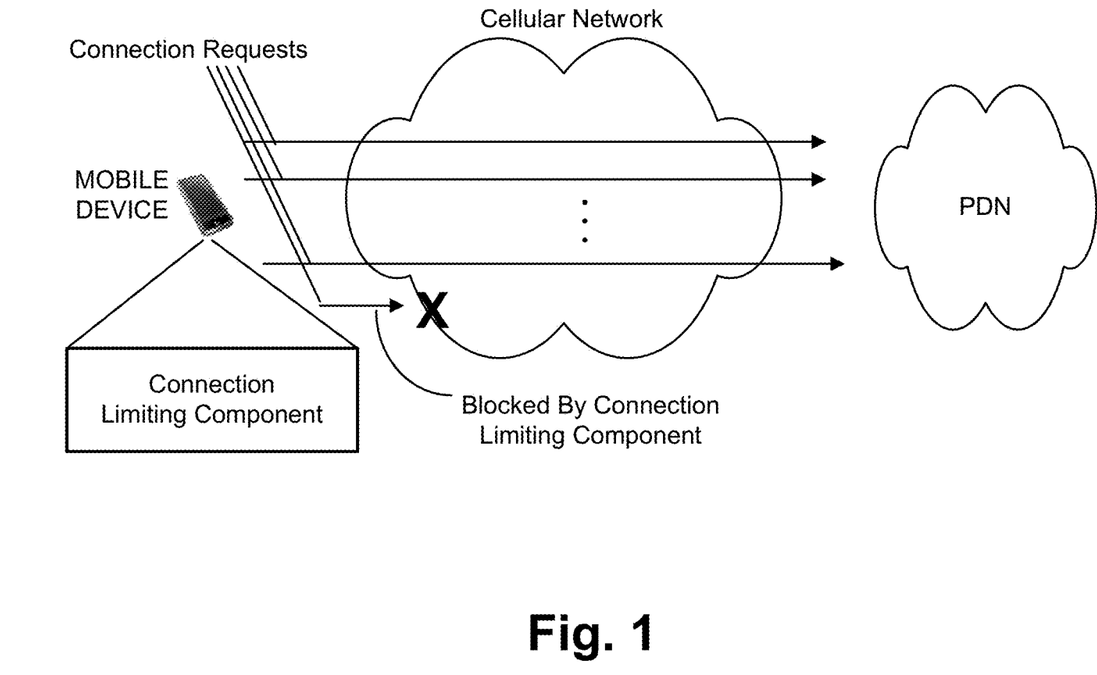
FIG. 1 is a diagram conceptually illustrating an example of an overview of concepts described herein.

FIG. 1 is a diagram conceptually illustrating an example of an overview of concepts described herein. As shown in FIG. 1, a mobile device, such as a cellular phone, may issue connection requests, to a cellular network, to create PDN connections. The connection requests may cause one or more devices in the cellular network to authenticate and establish a data connection between the mobile device and the PDN.

A connection limiting component may be implemented as part of the mobile device. The connection limiting component may include one or more hardware or software implemented counters ("connection counters") that are used to count the number of connection requests made by the mobile device. The connection limiting component may also include one or more hardware or software implemented timers ("connection timers") that are used to keep track of a time window that applies to the counters. Based on the connection counters and timers, the connection limiting component may determine whether a rate of connection requests, that are being generated by application programs or by other software components of the mobile device, is within a predetermined acceptable level. The connection limiting component may block connection requests when the rate of the issuance of the connection requests is no longer within the acceptable level (e.g., when the rate of issuance of the connection request is excessive, compared to the acceptable level).

As shown in FIG. 1, for example, a number of connection requests may be generated by the mobile device and issued to the cellular network. At some point, however, assume that a connection request, if sent, would place the mobile device into a state at which the rate of connection requests is excessive. This connection request may be blocked by the connection limiting component (illustrated as an "X" in FIG. 1).

Figure 2A:
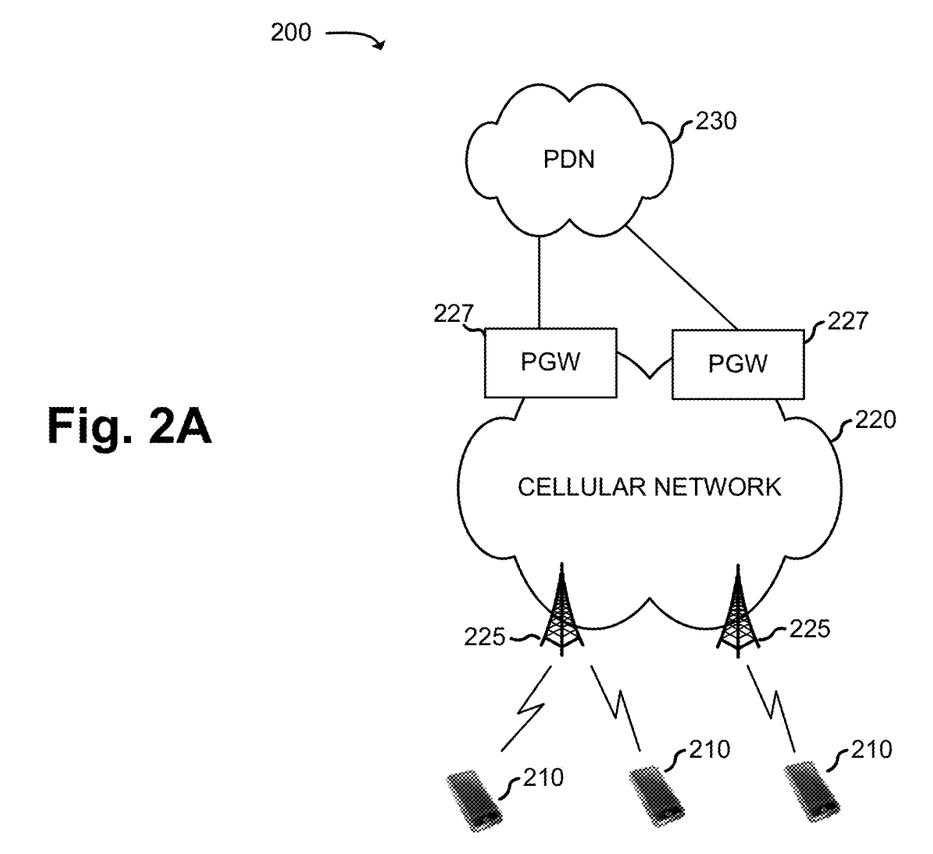
FIG. 2A is a diagram of an example environment in which systems and/or methods described herein may be implemented.

FIG. 2A is a diagram of an example environment 200 in which systems and/or methods described herein may be implemented. As illustrated, environment 200 may include one or more mobile devices 210, a cellular network 220, and a packet data network (PDN) 230.

Mobile devices 210 may include portable computing and communication devices, such as personal digital assistants (PDAs), smart phones, cellular phones, laptop computers with connectivity to a cellular wireless network, tablet computers, etc. Mobile devices 210 may also include non-portable computing devices, such as desktop computers, consumer or business appliances, set-top devices (STDs), or other devices that have the ability to connect to cellular network 220. Mobile devices 210 may connect, through a radio link, to cellular network 220. Through the radio link, mobile devices 210 may obtain data and/or voice services.

Cellular network 220 may include one or more devices that include radio interfaces to provide wireless connections to mobile devices 210. In addition, cellular network 220 may include network devices to provide core functionality relating to creating and managing communications with mobile devices 210. In one implementation, cellular network 220 may include a long term evolution (LTE) network. In this situation, cellular network 220 may be implemented using a flat, IP-based network architecture that includes one or more network devices or components that facilitate the providing of network access to mobile devices 210.

Cellular network 220, as illustrated, may include one or more base stations 225. In the context of an LTE network, each base station 225 may be referred to as an Evolved Node B (eNodeB). Each base station 225 may provide a radio interface over which the base station may communicate with mobile devices 210.

Cellular network 220 may connect to one or more other networks, such as to PDN 230 (e.g., the Internet), to provide network services to mobile devices 210. Cellular network 220 may include one or more packet data network gateways (PGWs) 227. Each PGW 227 may provide an interface for data sessions between cellular network 220 and PDN 230.

Figure 2B:
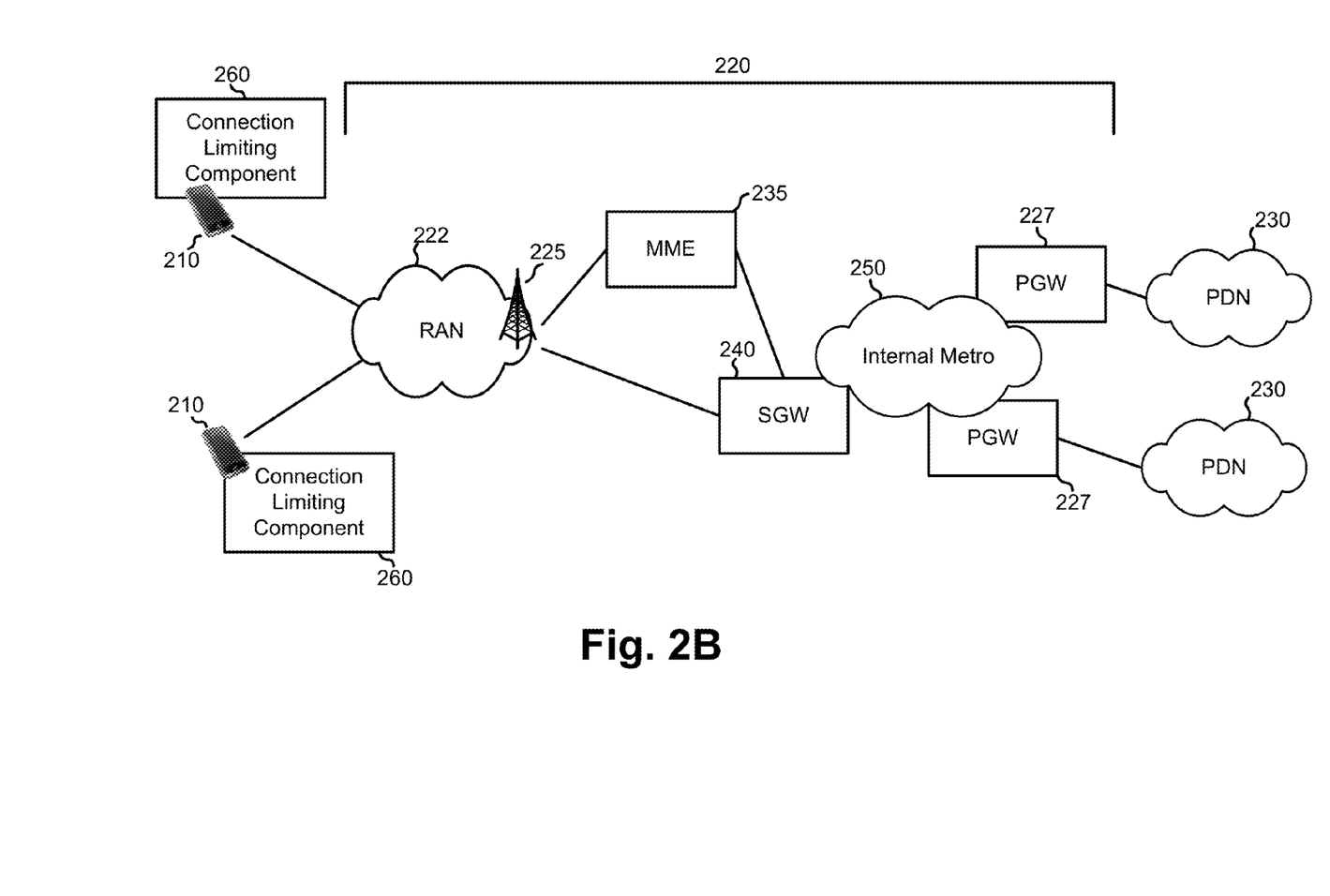
FIG. 2B is a diagram that illustrates a more detailed view of portions of the example environment of FIG. 2A.

FIG. 2B is a diagram that illustrates a more detailed view of portions of example environment 200.

In FIG. 2B, cellular network 220 may include a network implemented based on LTE network technologies. As shown in FIG. 2B, cellular network 220 may include radio access network (RAN) 222, base station 225, mobility management entity (MME) 235, serving gateway (SGW) 240, and PGWs 227. MME 235, SGW 240, and PGW 237 may be connected to one another, and to other devices, through one or more networks that are local to cellular network 220. For example, internal metro network 250, which may include a service provider metro network or high speed optical core network, may be used to transport traffic between SGW 240 and PGWs 227.

RAN 222 may represent the radio interface between mobile devices 210 and base station 225. RAN 222 may include, for example, orthogonal frequency-division multiplexing (OFDM) and/or single-carrier frequency-division multiple access (SC-FDMA) SC-FDMA based radio interfaces. RAN 222 may be implemented by radio modems in mobile devices 210 and corresponding radio modems implemented by base stations 225.

MME 235 may include one or more computation and communication devices that perform signaling for cellular network 220. MME 235 may, for example, be responsible for authenticating mobile devices 210, maintaining location information for mobile devices 210, and selecting a PGW 227 to service a particular mobile device 210. SGW 240 may include one or more computation and communication devices that route and forward user data packets. SGW 240 may route and forward user packets and also act as a mobility anchor during inter-base station handoffs.

PGWs 227 may include one or more computation and communication devices that provide connectivity from mobile devices 210 to PDNs 230. Each PGW 227 may provide connectivity from mobile devices 210 to a PDN 230 by being the point of exit and entry of traffic for mobile devices 210. A mobile device 210 may have simultaneous connectivity with more than one PGW 227 for accessing multiple PDNs 230. PGW 227 may perform policy enforcement, packet filtering, and charging support.

As is further shown in FIG. 2B, mobile devices 210 may each be associated with a connection limiting component 260. A particular connection limiting component 260, associated with a particular mobile device 210, may generally act to block network connection requests from the particular mobile device 210 to PGW 227, when connection limiting component 260 determines that the particular mobile device 210 is issuing an excessive number of network connection requests. In one implementation, connection limiting component 260 may be implemented in firmware or at the operating system level of mobile device 210. In this manner, the operation of connection limiting component 260 may be designed such that it is not configurable by users or applications installed by users of mobile device 210. Connection limiting component 260 may be implemented in hardware, software, or as a combination of hardware and software. The operation of connection limiting component 260, according to one or more implementations, will be described in more detail below.

Although FIGS. 2A and 2B illustrate example components of environment 200, in other implementations, environment 200 may contain fewer components, different components, differently arranged components, or additional components than those depicted in FIGS. 2A and/or 2B. Alternatively, or additionally, one or more components of environment 200 may perform one or more other tasks described as being performed by one or more other components of environment 200.

Figure 3A:
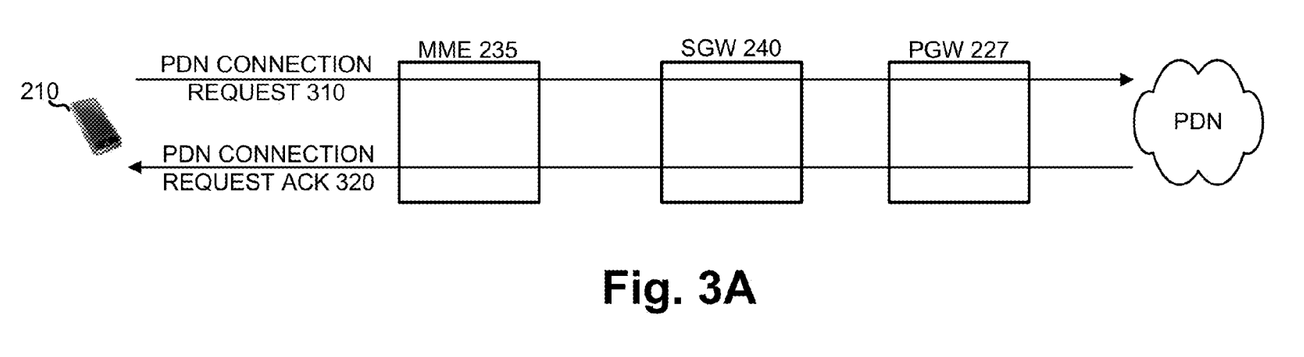
FIG. 3A is a diagram conceptually illustrating an example of signaling for a network connection request made by a mobile device.

FIG. 3A is a diagram conceptually illustrating an example of signaling for a network connection request made by mobile device 210 to PDN 230

As shown in FIG. 3A, mobile device 210 may issue a PDN connection request 310. PDN connection request 310 may be a request to initiate a data connection, though cellular network 220, to a packet-based data network, such as PDN 230. PDN connection request 310 may be initially received by base station 225 and processed by MME 235. MME 235 may, for example, provide authentication and/or other services relating to the request. PDN connection request 310 may also be processed by SGW 240, which may, for example, provide routing services for cellular network 220 or provide other services relating to the establishment of the PDN connection. PGW 227 may receive PDN connection request 310 from SGW 240. As previously mentioned, PGW 227 may implement a gateway between cellular network 220 and PDN 230. PGW 227 may acknowledge creation of the PDN connection. Mobile device 210 may, potentially after reception by one or more other network devices, receive acknowledgement of the PDN network connection, such as through PDN connection request acknowledgement 320. In one implementation, PDN connection request acknowledgement 320 may be received, by mobile device 210, as an LTE "Activate Default EPS Bearer Context Request" message.

Figure 3B:
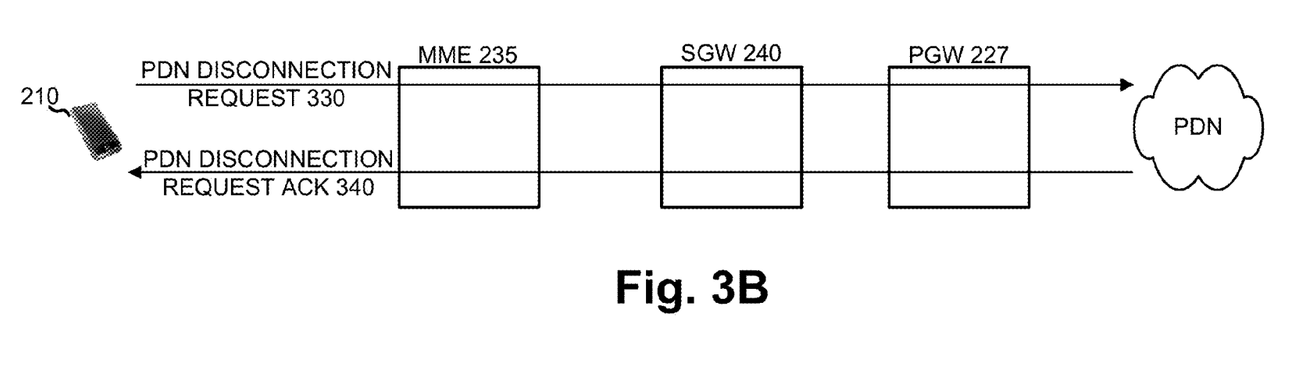
FIG. 3B is a diagram conceptually illustrating an example of signaling for the closing of a network connection, such as a network connection previously established through a PDN connection request.

FIG. 3B is a diagram conceptually illustrating an example of signaling for the terminating of a network connection, such as a network connection previously established through PDN connection request 310.

As shown in FIG. 3B, mobile device 210 may issue a PDN disconnection request 330 (which may also be referred to as a "teardown request"). Similar to PDN connection request 310, disconnection request 330 may be processed by one or more network devices, such as MME 235 and/or SGW 240, before being received by PGW 227. PGW 227 may act upon and acknowledge disconnection request 330. Mobile device 210 may, potentially after reception by one or more other network devices, receive acknowledgement of disconnection request 330, such as through disconnection acknowledgement 340. PDN disconnection request 330 may be received, by mobile device 210, as an LTE "Deactivate EPS Bearer Context Request" message.

Both PDN connection request 310 and PDN disconnection request 330 may use network resources of cellular network 220. For example, as illustrated in FIGS. 3A and 3B, MME 235, SGW 240, and/or PGW 227 may be involved the creation and/or teardown of PDN network connections. Each connection/disconnection operation, performed by cellular network 220, may use a non-trivial amount of resources of cellular network 220. A mobile device 210 that issues an excessive number of connection/disconnection requests can have a negative effect on cellular network 220, such as limiting the ability of cellular network 220 to effectively service other mobile devices 210.

Figure 4:
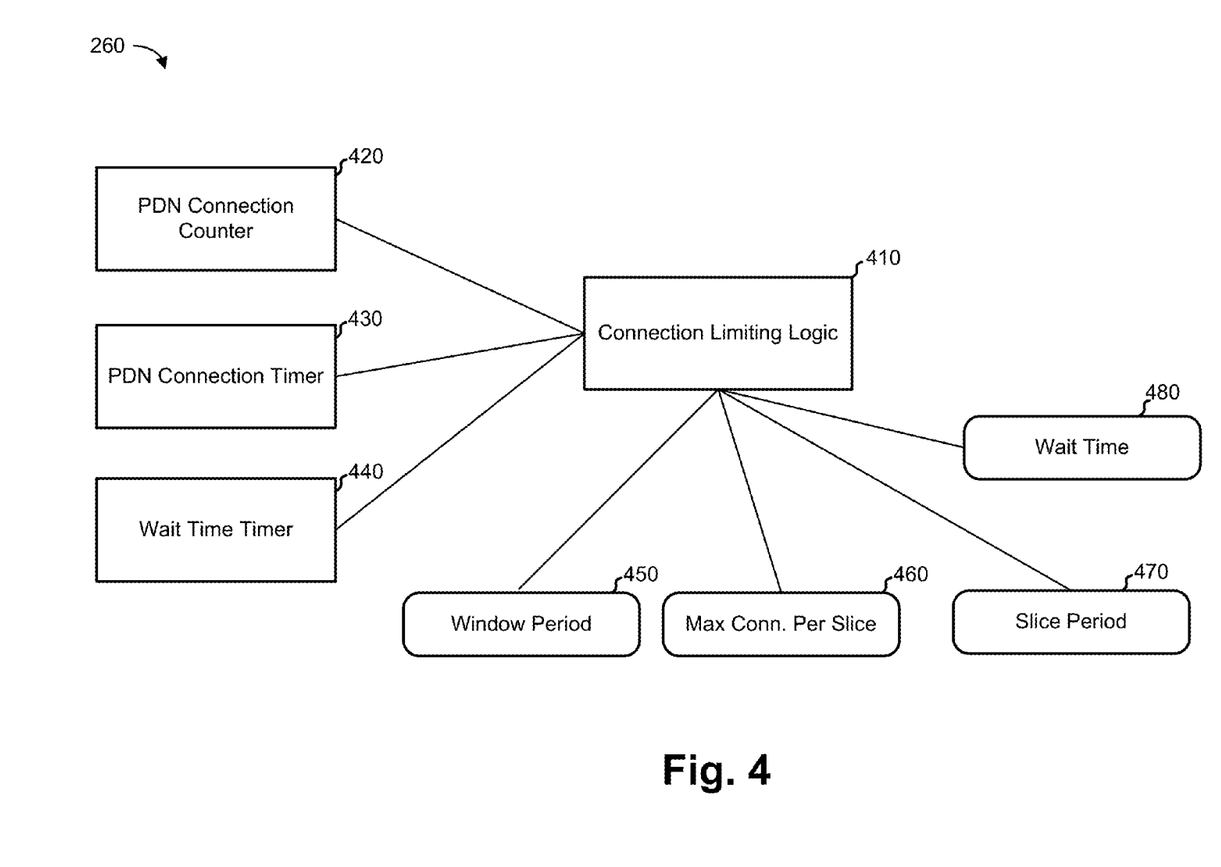
FIG. 4 is a diagram illustrating an example of functional components that may be associated with the connection limiting component shown in FIGS. 2A and 2B.

FIG. 4 is a diagram illustrating an example of functional components that may be associated with connection limiting component 260. Connection limiting component 260 may include or be associated with a number of parameters, counters, and/or timers. Based on the state of the parameters, counters, and/or timers, connection limiting logic 410, of connection limiting component 260, may determine whether to allow and/or block the issuance of new PDN connection requests. As illustrated in FIG. 4, connection limiting component 260 may include PDN connection counter 420, PDN connection timer 430, and wait time timer 440. Connection limiting component 260 may also include information regarding a number of parameters 450-480. Parameters 450-480 may include: window size parameter 450, maximum connections per slice parameter 460, slice period parameter 470, and wait time parameter 480. In one implementation, parameters 450-480 may be predetermined by an administrator or network operator. For example, parameters 450-480 may be set by an operator of cellular network 220.

In one implementation, connection limiting component 260 may be implemented on a per-PDN basis. In other words, mobile device 210 may separately limit connections for each PDN 230 to which mobile device 210 connects. A separate software or hardware instance of connection limiting component 260 may thus be implemented for each PDN 230 to which mobile device 210 connects.

PDN connection counter 420 may keep track of the number of successful PDN connection requests made by mobile device 210 (e.g., to a particular PDN). In one implementation, a PDN connection request may be considered to be successful when an acknowledgment, such as an "Activate Default EPS Bearer Context Request" message, is received from cellular network 220 in response to the PDN connection request. PDN connection counter 420 may be incremented in response to each successful PDN connection request. In other implementations, other techniques may be used to increment PDN connection counter 420. For example, connection counter 420 may be incremented each time a PDN connection request message is transmitted by mobile device 210.

In one implementation, PDN connection counter 420 may not be incremented for certain types of PDN connection requests or for certain options relating to PDN connection requests. For example, when the PDN connection request is piggybacked with an "Attach Request" message, PDN connection counter 420 may only be incremented when the "Request Type" information element in the PDN connection request message is set to "Initial Request."

PDN connection timer 430 may include a timer that measures the elapsed time since mobile device 210 was powered on or since PDN connection timer 430 was previously reset. In one implementation, connection limiting logic 410 may reset PDN connection timer 430 after a particular interval, such as an interval that is based on window period parameter 450.

Wait time timer 440 may include a timer that measures the elapsed time since a successful disconnection request (e.g., a disconnection request that is issued and acknowledged) was initiated by mobile device 210. Connection limiting logic 410 may block PDN connection requests that are made less than a threshold amount of time after a successful disconnection request. Wait time timer 440 may be used by connection limiting logic 410 to determine whether the threshold amount of time has passed. In one implementation, wait time timer 440 may be initially set to a value of wait time parameter 480 and then count down to zero. Upon a successful PDN disconnection procedure, initiated by mobile device 210, connecting limiting logic 410 may set wait time timer 440 to its initial value (e.g., the value of wait time parameter 480) and initiate the counting down of wait time timer 440 towards zero. Connecting limiting logic 410 may block subsequent PDN connection requests until wait time timer 440 reaches zero. In situations in which mobile device 210 issues a PDN disconnection request, and cellular network 220 rejects the request (e.g., via a "PDN Disconnect Reject" message), wait time timer 440 may not be started (e.g., wait time timer 440 may be set to zero) and accordingly, subsequent PDN connection requests may not be blocked by cellular network 220.

The counter (PDN connection counter 420) and timers (PDN connection timer 430 and wait time timer 440) described above may be implemented in hardware, software, and/or a combination of hardware and software. For example, in some implementations, PDN connection counter 420 may correspond to a hardware register. In other implementations, PDN connection counter 420 may be implemented as a software variable that is incremented by connection limiting logic 410. Similarly, in some implementations, PDN connection timer 430 and/or wait time timer 440 may correspond to hardware timer modules that independently calculate elapsed time intervals. In other implementations, PDN connection counter 420 and PDN connection timer 430 may be implemented as software variables in which connection limiting logic 410 may store a start time and compare the stored start time values to the current time to obtain elapsed timer values.

As previously mentioned, connection limiting component 260 may also include information regarding parameters 450-480. Window period parameter 450 may define a particular time window over which PDN connection counter 420 operates. At the end of the time period defined by window period parameter 450, PDN connection counter 420 may be reset and the operation of connection limiting logic 410 to potentially block PDN connection requests may be reinitialized. In this manner, the operation of connection limiting logic 410 in blocking connection requests may be based on a rate of connection request issuance (by mobile device 210) in discrete windows of time.

Maximum connections per slice parameter 460 may define a value that relates to the maximum number of connections that are allowed per sub-window (slice) of time within the window period. Slice period parameter 470 may define the length of each slice. For example, in one implementation, slice period parameter 470 may be set to 300 seconds (five minutes), and maximum connections per slice parameter 460 may be set to 10. With these example values, connection limiting logic 410 may allow up to 10 additional successful PDN connection requests for each five minute slice.

Wait time parameter 480 may store the value that is initially set for wait time timer 440. As previously mentioned, this value may relate to the amount of time that connection limiting component 260 causes mobile device 210 to wait before allowing issuance of a new PDN connection request after successfully disconnecting from a previous PDN connection. In some implementations, the value of wait time parameter 480 may be configurable by one or more devices in cellular network 220. For example, an over the air device management (OTADM) protocol may be used to set the value of wait time parameter 480. In other implementations, other or additional parameters, such as window period parameter 450, maximum connection per slice parameter 460, and slice period parameter 470 may be received via OTADM.

The values given above for window period parameter 450, maximum connections per slice parameter 460, slice period parameter 470, and wait time parameter 480 are examples. In general, other values can be selected for these parameters based on the particular capabilities and limits of cellular network 220. In some implementations, the values for one or more of parameters 450-480 may be hardcoded into mobile device 210 (e.g., set during manufacture of mobile device 210). Alternatively or additionally, the values for parameters 450-480 may be dynamically configurable (e.g., by an operator associated with cellular network 220).

Although FIG. 4 illustrates an example of functional components that may be included in connection limiting component 260, in other implementations, connection limiting component 260 may contain fewer components, different components, differently arranged components, or additional components than those depicted in FIG. 4. Alternatively, or additionally, one or more components of connection limiting component 260 may perform one or more other tasks described as being performed by one or more other components of connection limiting component 260.

Figure 5:
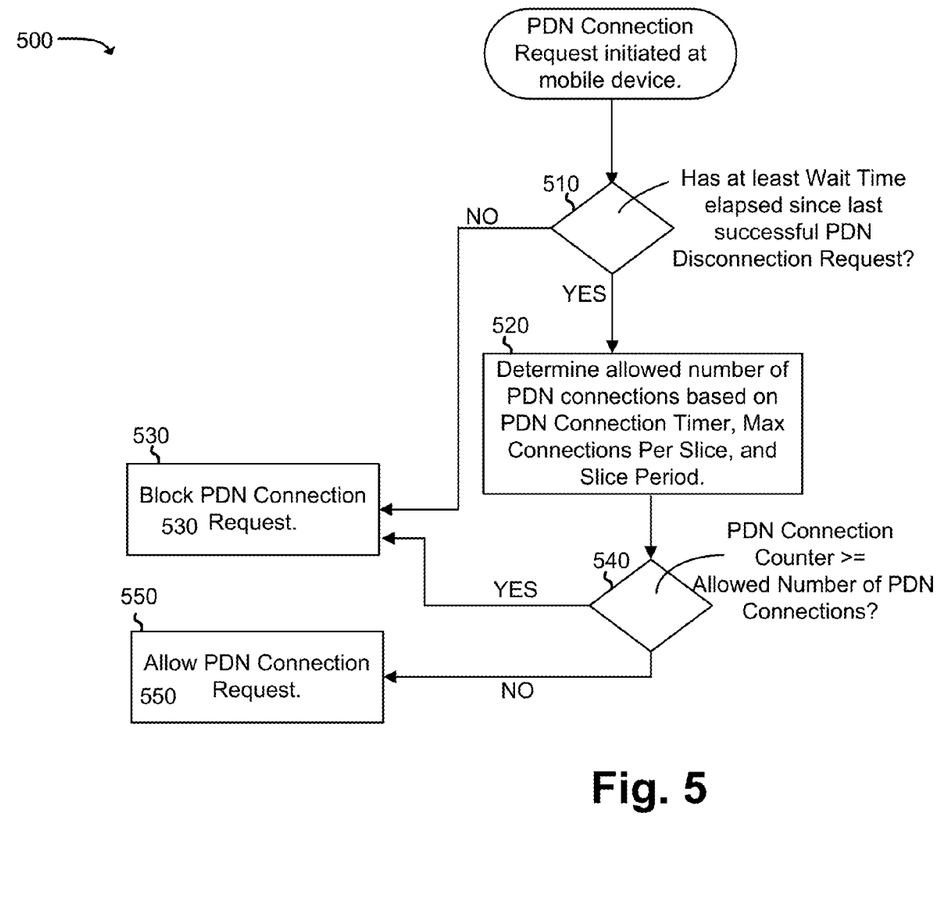
FIG. 5 is a flow chart illustrating an example process for blocking excessive PDN connection requests.

FIG. 5 is a flow chart illustrating an example process 500 for blocking excessive PDN connection requests. In one implementation, process 500 may be performed by mobile device 210, such as by connection limiting component 260 of a particular mobile device 210.

As previously mentioned, although not explicitly shown in FIG. 5, connection limiting component 260 may operate to periodically reset PDN connection counter 420 and PDN connection timer 430 (e.g., to zero). The resetting may be done based on the time period specified by the value of window period parameter 450. This may effectively restart the blocking of excessive PDN connection requests. PDN connection counter 420 may subsequently be incremented whenever a PDN connection request is acknowledged (e.g., via PDN connection request acknowledgement 320).

Process 500 may begin in response to an indication that a PDN connection request has been initiated at a mobile device. A PDN connection request may be initiated by, for example, a higher logical layer of the mobile device than connection limiting component 260. For example, if connection limiting component 260 is implemented at the firmware or operating system level, the PDN connection request may be initiated at the application level. Connection limiting component 260 may be implemented to have the ability to intercept and block the PDN connection request.

Process 500 may include determining whether the predetermined wait time value has elapsed since the last successful PDN disconnection request (block 510). For example, connection limiting logic 410 may determine whether wait time timer 440 has expired (e.g., reached zero). The expiration of wait time timer 440 may indicate that at least the minimum required wait time period (e.g., as indicated by wait time parameter 480), between reception of the acknowledgment of a disconnection request and sending of a new PDN connection request, has elapsed. As described below, when wait time timer 440 has not expired, the PDN connection request may be blocked.

When the wait time has not elapsed since the last successful PDN disconnection request (block 510—NO), process 500 may include blocking the PDN connection request (block 530). For example, connection limiting logic 410 may block or otherwise cancel the PDN connection request before the PDN connection request is transmitted, by mobile device 210, to cellular network 220. Connection limiting logic 410 may report the blocking of the PDN connection request as an error message for the issuing process at mobile device 210.

When at least the wait time has elapsed since the last successful PDN disconnection request (block 510—YES), process 500 may include determining an allowed number of PDN connections based on the PDN connection timer, the maximum allowed connections per slice, and/or the slice period (block 520). The allowed number of PDN connections may represent the number of PDN connections, as indicated by the PDN connection counter, before connection limiting logic 410 begins to block PDN connection requests. In one implementation, each slice within a window period may be allotted a particular number of connections, indicated by the value of maximum connections per slice parameter 460. In this implementation, the allowed number of PDN connections may be calculated as:

$$\text{round}[(\text{PDN\_CONN\_TIME}/\text{SLICE\_PERIOD}) * \text{MAX\_CONN\_PER\_SLICE}], \quad (1)$$

where PDN_CONN_TIME represents the value indicated by PDN connection timer 430, SLICE_PERIOD represents the value of slice parameter 470, MAX_CONN_PER_SLICE represents the value of maximum connection per slice parameter 460, and "round" indicates a function to round to the nearest integer.

Figure 6:
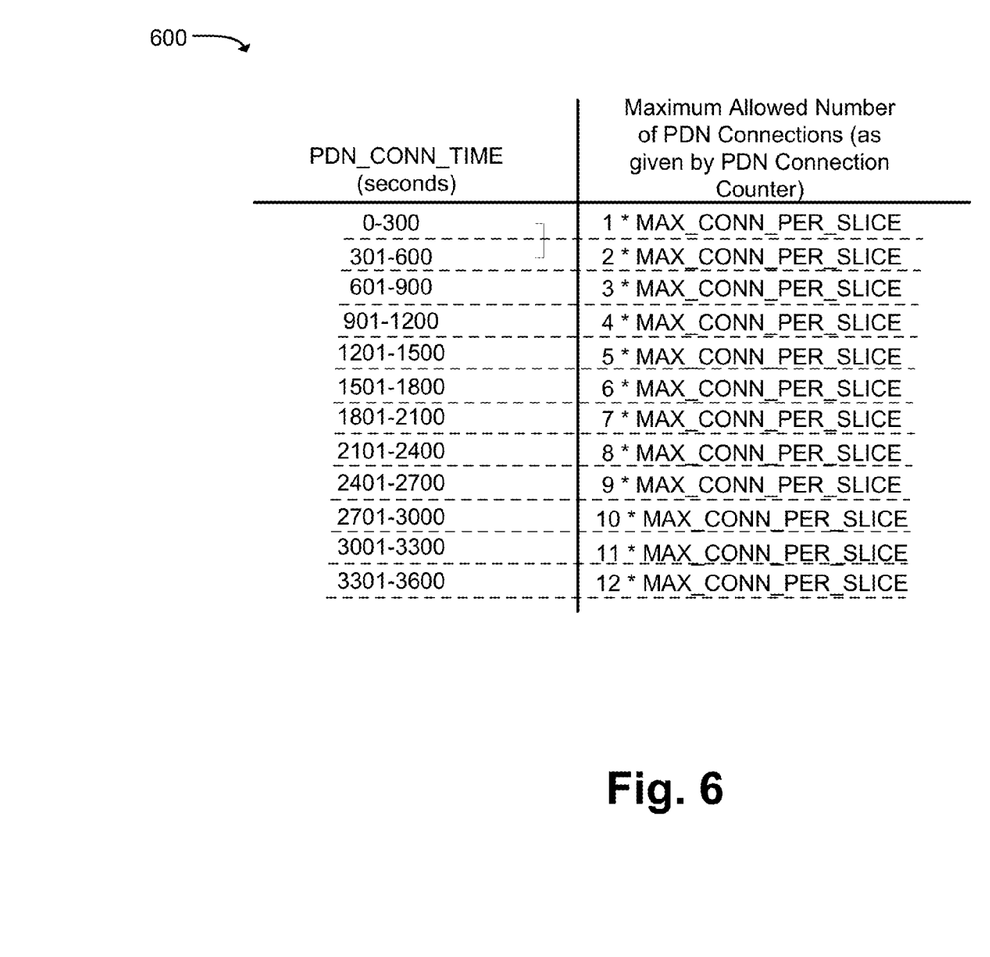
FIG. 6 is a diagram illustrating a table of one example of a set of allowed PDN connection values.

When using formula (I) to calculate the allowed number of PDN connections, for any particular slice of a window, the allowed number of PDN connections may be constant at any instant of time within a particular slice. In one implementation, the allowed number of PDN connections may be precalculated. FIG. 6 is a diagram illustrating a table 600 of one example of a set of allowed PDN connections. In the example of FIG. 6, various values for the allowed number of PDN connections are illustrated based on ranges of values of PDN connection timer 430. In this example, the value of window period parameter 450 is 3600 seconds, and the value of slice period parameter 470 is 300 seconds. In one implementation, determining an allowed number of PDN connections (at block 520) may be implemented as a lookup into table 600.

Process 500 may further include determining whether the PDN connection counter is greater than or equal to the determined allowed number of PDN connections (block 540). In one implementation, the value of PDN connection counter 420 may be compared to the allowed number of PDN connections. Additionally, in some implementations, the value of PDN connection counter 420 may also be compared to the maximum possible number of allowed PDN connections (e.g., the number of PDN connections allowed in the last slice of a window; in the example of FIG. 6, 12*MAX_CON-N_PER_SLICE). If either of these comparisons is true (i.e., the value of PDN connection counter 420 is greater than or equal to the allowed number of PDN connections or the value of PDN connection counter 420 is greater than or equal to the maximum possible number of allowed PDN connections), connection limiting logic 410 may determine that an excessive number of PDN connection requests have been issued (e.g., block 540 is YES).

Process 500 may further include, when an excessive number of PDN connection requests are determined to have been issued (block 540—YES), blocking the PDN connection request (block 530). As previously mentioned, blocking the PDN connection request may include blocking or otherwise canceling the PDN connection request before the PDN connection request is transmitted, by mobile device 210, to cellular network 220. Connection limiting logic 410 may report the blocking of the PDN connection request as an error message for the issuing process at mobile device 210.

Process 500 may further include, when there is no determination of an excessive number of PDN connection requests (block 540—NO), allowing the PDN connection request (block 550). For example, the PDN connection request may be transmitted to cellular network 220.

In one implementation, when a PDN connection request is determined to be blocked (block 540) due to an excessive number of PDN connection requests, connection limiting logic 410 may continue to block all subsequent PDN connection requests for a predetermined time period. For example, when a PDN connection request is blocked, all subsequent PDN connection requests within the next 15 minutes (or other time period) may also be blocked. At the expiration of the predetermined time period, PDN connection counter 420 and PDN connection timer 430 may be reset, and PDN connection requests may once again be allowed to be transmitted.

In some implementations, the values of PDN connection counter 420 and PDN connection timer 430 may be maintained across system transitions and may not be reset when mobile device 210 changes operation modes, such as changing from regular mode to "airplane" mode and back to regular mode. In some implementations, the values of PDN connection counter 420 and PDN connection timer 430 may be maintained when other changes occur to mobile device 210, such as when one or more radio transceivers are powered on or off.

Figure 7:
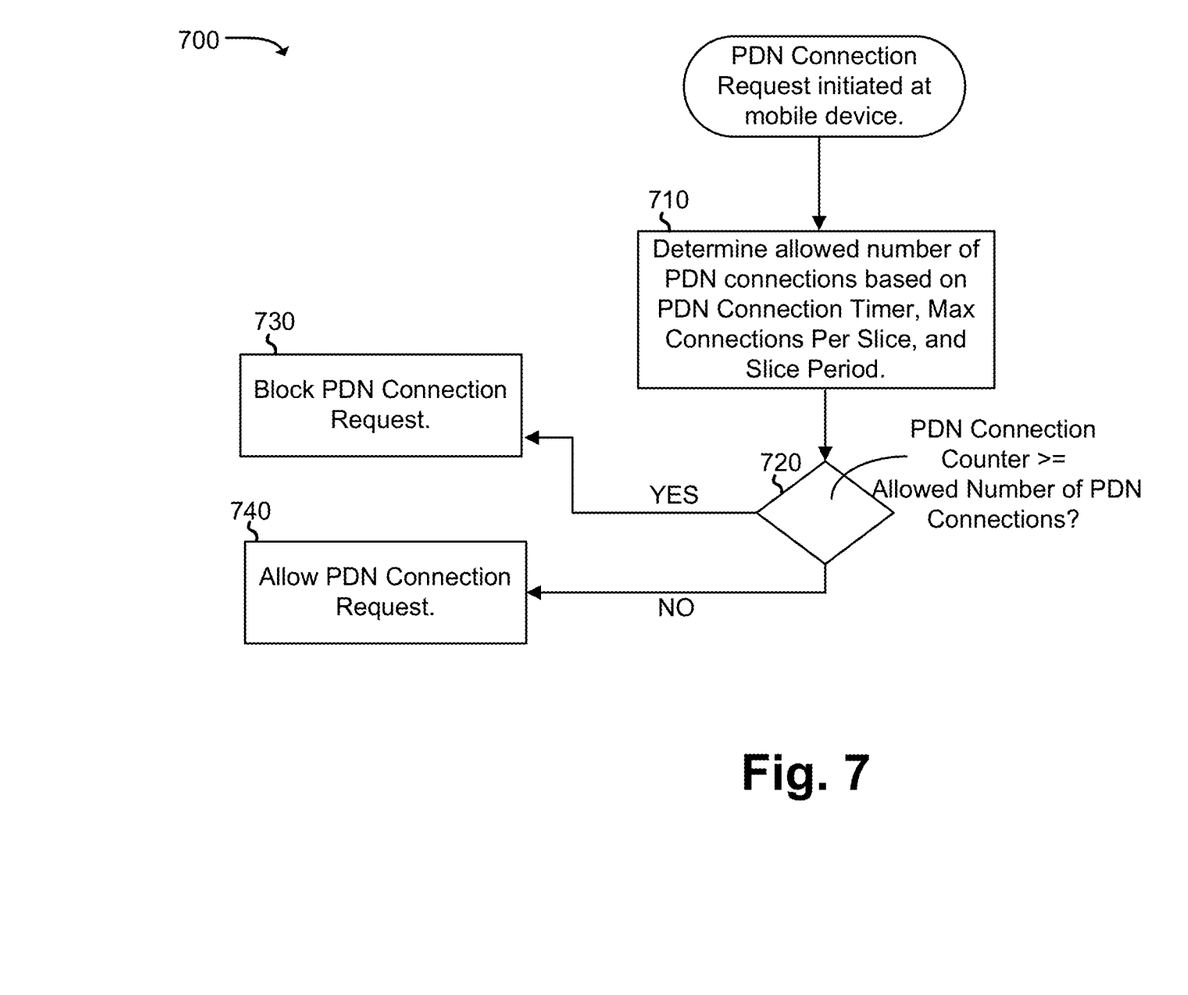
FIG. 7 is a flow chart illustrating an example process for blocking excessive PDN connection requests.

FIG. 7 is a flow chart illustrating an example process 700 for blocking excessive PDN connection requests. Process 700 may include an alternate implementation to process 700 in which wait time timer 440 and wait time parameter 480 are not implemented or equivalently, wait time timer 440 and wait time parameter 480 may be implemented but the value of wait time parameter 480 may be set to zero.

Process 700 may be performed in response to a PDN connection request being initiated at mobile device 210. Process 700 may include determining an allowed number of PDN connections based on a PDN connection timer, a maximum allowed number of connections per slice, and a length of a slice period (block 710). The allowed number of PDN connections may represent the number of PDN connections, as indicated by a PDN connection counter, before connection limiting logic 410 begins to block PDN connection requests. In one implementation, each slice within a window period may be allotted a particular number of connections, indicated by the value of maximum connections per slice parameter 460. In this implementation, the allowed number of PDN connections may be calculated using formula (I), given above.

Process 700 may further include determining whether the PDN connection counter is greater than or equal to the determined allowed number of PDN connections (block 720). In one implementation, the value of PDN connection counter 420 may be compared to the allowed number of PDN connections. Additionally, in some implementations, the value of PDN connection counter 420 may also be compared to the maximum possible number of allowed PDN connections (e.g., in the example of FIG. 6, 12*MAX_CONN_PER_SLICE). If either of these comparisons is true (i.e., the value of PDN connection counter 420 is greater than or equal to the allowed number of PDN connections or the value of PDN connection counter 420 is greater than or equal to the maximum possible number of allowed PDN connections), connection limiting logic 410 may determine that an excessive number of PDN connection requests have been issued (e.g., block 720 is YES).

Process 700 may further include, when an excessive number of PDN connection requests are determined to have been issued (block 720—YES), blocking the PDN connection request (block 730). As previously mentioned, blocking the PDN connection request may include blocking or otherwise canceling the PDN connection request before the PDN connection request is transmitted, by mobile device 210, to cellular network 220. Connection limiting logic 410 may report the blocking of the PDN connection request as an error message for the issuing process at mobile device 210.

Process 500 may further include, when there is no determination of an excessive number of PDN connection requests (block 720—NO), allowing the PDN connection request (block 740). For example, the PDN connection request may be transmitted a cellular network 220.

Figure 8:
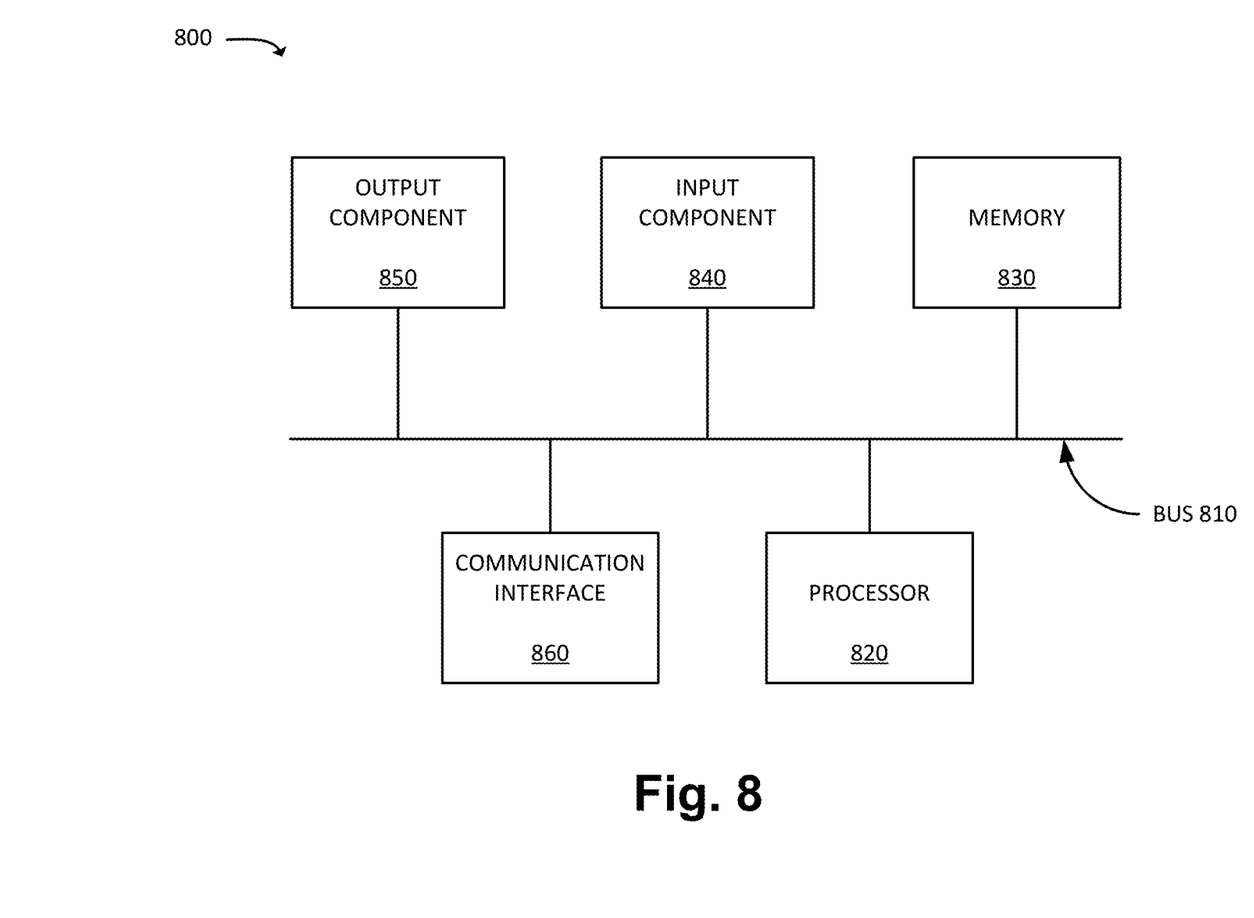
FIG. 8 is a diagram of example components of a device, which may implement systems and/or methods described herein.

FIG. 8 is a diagram of example components of a device 800. Each of the devices illustrated in FIGS. 1, 2A, and/or 2B may include one or more devices 800. Device 800 may include bus 810, processor 820, memory 830, input component 840, output component 850, and communication interface 860. In another implementation, device 800 may include additional, fewer, different, or differently arranged components. Some non-limiting examples of device 800, with additional and/or different components, are discussed below.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as a wide area/cellular network radio transceiver, an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface. Device 800 may perform certain operations relating to computing an estimated location of a device and/or a distance of the device from a base station. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 5 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
    tracking, by a mobile device, an amount of successful packet data network (PDN) connection requests issued by the mobile device over a cellular network;
    maintaining, by the mobile device, a timer value relating to an amount of time over which the successful PDN connection requests have been tracked;
    determining, by the mobile device and based on the timer value, an allowable number of PDN connection requests;
    comparing, by the mobile device, the amount of successful PDN connection requests to the allowable number of PDN connection requests;
    determining, by the mobile device and based on the comparison, whether to block a PDN connection request from being issued to the cellular network;
    blocking, by the mobile device, the PDN connection request from being issued to the cellular network when the determination is to block the PDN connection request; and
    transmitting, by the mobile device, the PDN connection request to the cellular network when the determination is to not block the PDN connection request.

2. The method of claim 1, further comprising:
    periodically resetting the tracking of the amount of successful PDN connection requests and the timer value.

3. The method of claim 2, wherein periodically resetting the tracking of the amount of successful PDN connection requests is performed based on a first time period, and wherein determining the allowable number of PDN connection requests further includes:
    receiving a second time period, less than the first time period, indicating a length of time used to divide the first period into slices;
    determining, based on the timer value and the second time period, an integer amount of slices into the first time period; and
    calculating the allowable number of PDN connection requests based on multiplication of the integer amount of slices and a parameter indicating a number of connections per slice.

4. The method of claim 1, further comprising:
    receiving acknowledgement of a successful PDN disconnection request; and
    blocking, based on the reception of the acknowledgement of the successful PDN disconnection request, transmission of additional PDN connection requests for a particular time period.

5. The method of claim 4, wherein the particular time period and a threshold value used to determine the allowable number of PDN connection requests are updateable, by the cellular network, via an over the air device management (OTADM) protocol.

6. The method of claim 1, wherein tracking the amount of successful PDN connection requests includes:
    incrementing a counter in response to reception of a successful acknowledgement of a previously issued PDN connection request.

7. The method of claim 1, wherein the determination of whether to block the PDN connection request and the blocking of the PDN connection request is performed on a per-PDN basis.

8. The method of claim 1, wherein the determination of the allowable number of PDN connection requests further includes:
    calculating the allowable number of PDN connection requests based on the formula:

$$(PDN\_CONN\_TIME/SLICE\_PERIOD)*MAX\_CONN\_PER\_SLICE,$$

where PDN_CONN_TIME represents the timer value, SLICE_PERIOD represents a predetermined time period, and MAX_CONN_PER_SLICE represents a predetermined value relating to an amount of allowed PDN connections.

9. The method of claim 1, wherein, when the determination is made to block the PDN connection request from being issued to the cellular network, the method further includes:

blocking all subsequent PDN connection requests for a predetermined time period.

10. A mobile device comprising:
a memory device;
at least one processor to:
    track an amount of successful packet data network (PDN) connection requests issued by the mobile device over a cellular network;
    maintain a timer value relating to an amount of time over which the successful PDN connection requests have been tracked;
    determine, based on the timer value, an allowable number of PDN connection requests;
    compare the amount of successful PDN connection requests to the allowable number of PDN connection requests;
    determine, based on the comparison, whether to block a PDN connection request from being issued to the cellular network;
    block the PDN connection request from being issued to the cellular network when the determination is to block the PDN connection request; and
    transmit the PDN connection request to the cellular network when the determination is to not block the PDN connection request.

11. The mobile device of claim 10, wherein the at least one processor is further to:
    periodically reset the tracking of the amount of successful PDN connection requests and the timer value.

12. The mobile device of claim 11, wherein periodically resetting the tracking of the amount of successful PDN connection requests is performed based on a first time period, and wherein, when determining the allowable number of PDN connection requests, the at least one processor is further to:
    receive a second time period, less than the first time period, indicating a length of time used to divide the first period into slices;
    determine, based on the timer value and the second time period, an integer amount of slices into the first time period; and
    calculate the allowable number of PDN connection requests based on multiplication of the integer amount of slices and a parameter indicating a number of connections per slice.

13. The mobile device of claim 10, wherein the at least one processor is further to:
    receive acknowledgement of a successful PDN disconnection request; and
    block, based on the reception of the acknowledgement of the successful PDN disconnection request, transmission of additional PDN connection requests for a particular time period.

14. The mobile device of claim 13, wherein the particular time period and a threshold value used to determined the allowable number of PDN connection requests are updateable, by the cellular network, via an over the air device management (OTADM) protocol.

15. The mobile device of claim 10, wherein tracking the amount of successful PDN connection requests includes:
    incrementing a counter in response to reception of a successful acknowledgement of a previously issued PDN connection request.

16. The mobile device of claim 10, wherein the determination of whether to block the PDN connection request and the blocking of the PDN connection request is performed on a per-PDN basis.

17. The mobile device of claim 10, wherein the at least one processor is further to, when the determination is made to block the PDN connection request from being issued to the cellular network:
    block all subsequent PDN connection requests for a predetermined time period.

18. A mobile device comprising:
a memory to store:
    a first parameter that indicates a first length of time over which the mobile device is to operate to potentially block packet data network (PDN) connection requests issued by processes of the mobile device to a cellular network,
    a second parameter that indicates a second length of time, shorter than the first length of time, that is used to divide the first length of time, into slices, and
    a third parameter that indicates an amount of allowable PDN connections, made via the cellular network, in the second length of time;
a counter to track an amount of successful PDN connection requests, issued by the mobile device, within the first length of time; and
logic to:
    determine, based on a value of the second parameter and a value of the third parameter, an allowable amount of PDN connection requests,
    compare the amount of successful PDN connection requests to the allowable amount of PDN connection requests,
    determine, based on the comparison, whether to block a particular PDN connection request, generated by one or more of the processes of the mobile device, from being issued to the cellular network;
    block the particular PDN connection request from being issued to the cellular network when the determination is to block the PDN connection request; and
    transmit the particular PDN connection request to the cellular network when the determination is to not block the PDN connection request.

19. The mobile device of claim 18, wherein the memory is further to store:
    a fourth parameter that indicates a wait period; and
    wherein the logic is further to:
        receive acknowledgement of the transmission of a particular PDN disconnection request; and
        block, after receiving the acknowledgement of the transmission of the particular PDN disconnection request, transmission of additional PDN connection requests for the wait period.

20. The mobile device of claim 19, wherein at least one of the first, second, third, and fourth parameters are updateable, by the cellular network, via an over the air device management (OTADM) protocol.

21. The mobile device of claim 18, further comprising:
    a timer to track an amount of time over which the mobile device has operated to potentially block PDN connection requests; and
    wherein the logic is further to:
        reset the counter and reset the timer when a value of the timer reaches the first length of time.

22. The mobile device of claim 18, wherein the logic is further to:
    increment the counter in response to reception of a successful acknowledgement of a previously issued PDN connection request.

23. The mobile device of claim 18, wherein the memory, the counter, and the logic are implemented on a per-PDN basis.

24. The mobile device of claim 17, wherein, when the logic determines to block the PDN connection request from being issued to the cellular network, the logic is further to:
  block all subsequent PDN connection requests for a predetermined time period.

\* \* \* \* \*